(12) United States Patent
Mooney

(10) Patent No.: US 8,626,711 B2
(45) Date of Patent: Jan. 7, 2014

(54) SYSTEMS, METHODS, AND MEDIA FOR CORRELATING OBJECTS ACCORDING TO RELATIONSHIPS

(76) Inventor: Daniel Allan Mooney, Tulsa, OK (US)

(*) Notice: Subject to any disclaimer, the term of this patent is extended or adjusted under 35 U.S.C. 154(b) by 0 days.

(21) Appl. No.: 13/544,980

(22) Filed: Jul. 9, 2012

(65) Prior Publication Data
US 2013/0013607 A1    Jan. 10, 2013

Related U.S. Application Data

(60) Provisional application No. 61/505,112, filed on Jul. 7, 2011.

(51) Int. Cl.
*G06F 17/30* (2006.01)

(52) U.S. Cl.
USPC ........... 707/625; 707/617; 707/626; 707/748; 707/769; 709/201; 709/203; 709/213; 709/217

(58) Field of Classification Search
USPC .......... 707/625, 617, 626, 769, 748; 709/201, 709/203, 213, 217
See application file for complete search history.

(56) References Cited

U.S. PATENT DOCUMENTS

| | | | |
|---|---|---|---|
| 6,718,069 B2* | 4/2004 | Mollov et al. | 382/265 |
| 2002/0159649 A1* | 10/2002 | Mollov et al. | 382/261 |
| 2013/0013429 A1* | 1/2013 | Mooney et al. | 705/14.73 |

* cited by examiner

*Primary Examiner* — Frantz Coby
(74) *Attorney, Agent, or Firm* — John M. Behles

(57) ABSTRACT

Systems, methods, and media for correlating objects according to relationships are provided herein. According to some embodiments, methods may include the steps of for each object in a database, determining a static weight, the static weight representing a number of relational connections between each object and one or more connected entities, setting a delta weight for each object, the delta weight being equal to the static weight, determining which object in the database comprises a highest delta weight, propagating the highest delta weight of the object to each of the connected entities, adding the highest delta weight to a static weight and a delta weight for each of the connected entities, setting the delta weight for the object to zero, wherein the method terminates upon determining that a highest delta weight for at least one object is below a threshold value.

20 Claims, 8 Drawing Sheets

SYSTEMS, METHODS, AND MEDIA FOR CORRELATING OBJECTS ACCORDING TO RELATIONSHIPS

CROSS REFERENCE TO RELATED APPLICATION

This Non-Provisional U.S. Patent Application claims priority to Provisional U.S. Patent Application 61/505,112, filed on Jul. 7, 2011, entitled "SYSTEMS, METHODS, AND MEDIA FOR CORRELATING OBJECTS ACCORDING TO RELATIONSHIPS" which is hereby incorporated by reference herein in its entirety.

FIELD OF THE INVENTION

This invention relates generally to the correlation of objects according to relationships or connections, and more particularly, but not by way of limitation, to systems, methods, and media for correlating objects according to relationships and displaying the correlated content in a visual format.

BACKGROUND

Generally speaking, different types of content may be interrelated together in a variety of intuitive and non-intuitive ways. For example, an artist may be interrelated with books, music, architecture, or other content that served to influence the artist. While relationships between these interrelated types of content may be apparent, other relationships may be less apparent. Unbeknownst to the artist, they may have influenced other individuals or works of art. These interrelated relationships are often described according to degrees of separation. That is, two seemingly unrelated objects may be correlated to one another based upon intervening relationships or connections therebetween.

Unfortunately, current methods for correlating objects according to relationships are time consuming and subjectively biased processes. More specifically, current methods for correlating objects are manual processes that are subject to human error. Moreover, these methods do not display the relationships between correlated objects in visual format.

SUMMARY OF THE INVENTION

According to some embodiments, the present disclosure may be directed to methods for correlating objects together in a database according to relational data. These methods may comprise, for each object in a database, (a) determining a static weight, the static weight representing a number of relational connections between each object and one or more connected entities; (b) setting a delta weight for each object, the delta weight being equal to the static weight; (c) determining which object in the database comprises a highest delta weight; (d) propagating the highest delta weight of the object to each of the connected entities; (e) adding the highest delta weight to a static weight and a delta weight for each of the connected entities; (f) setting the delta weight for the object to zero; and (g) wherein the method terminates upon determining that a highest delta weight for at least one object is below a threshold value.

According to some embodiments, the present disclosure may be directed to methods for processing a query. These methods may comprise: (a) receiving query via a web server, from a client device; and (b) generating, via the web server, a response for the query by: (i) determining a header object in the query; (ii) determining directly connected entities and indirectly connected entities in the database for the header object based upon relevancy; and (iii) assembling the response using the directly connected entities and the indirectly connected entities.

According to additional embodiments, the present disclosure may be directed to systems for correlating objects together in a database according to relational data. These systems may comprise: (a) at least one server that is selectively coupleable to a client device, the at least one server comprising a processor configured to execute instructions that comprise: (i) an analysis module that, for each object in a database: (1) determines a static weight, the static weight representing a number of relational connections between each object and one or more connected entities; (2) sets a delta weight for each object, the delta weight being equal to the static weight; (3) determines which object in the database comprises a highest delta weight; (4) propagates the highest delta weight of the object to each of the connected entities; (5) adds the highest delta weight to a static weight and a delta weight for each of the connected entities; (6) sets the delta weight for the object to zero; and (7) wherein upon the analysis module determining that a highest delta weight for at least one object is below a threshold value, the analysis module terminates.

DETAILED DESCRIPTION OF EXEMPLARY EMBODIMENTS

Generally speaking, the present technology may be directed to the correlating and displaying of objects via relational analyses. A relationship between a first object and one or more additional objects may be based upon one or more relatable characteristics, relationships, or connections shared therebetween. For example, the relationships between a musician and their discography, influences, etc., could relate the musician to other musicians, books, movies, and the like. These relationships may be displayed to the end user in a variety of formats such as a grid or matrix.

It is noteworthy to mention that objects may include musicians, books, video, advertisements, locations, and so forth. The definition of object is to be understood to be expansive, including both tangible and intangible types of content.

In addition, the present technology may be configured to correlate similar or different types of objects together based upon one or more relatable characteristics or relationships shared therebetween. The present technology may then trace a path(s) between the two or more objects and explain the relationships therebetween. For example, a musician may be indirectly related to an author of a book, based upon any one or more of a number of factors (e.g., a know relationship, explicit statements, and so forth). The systems provided herein may visually depict both the musician and the author utilizing image files, along with any intervening objects that connect the two objects together. Information that was utilized to connect the two objects together may also be provided to enhance the presentation of information to the end user. In other embodiments, the present technology may utilize a ribbon of images for each intervening object. These intervening images may be positioned between the images of the two objects to create a visual, diagrammatic path therebetween.

According to some embodiments, the present technology may utilize one or more relational databases and one or more mathematical algorithms (e.g., statistics, heuristics, and so forth) to correlate objects together. Advantageously, end users may contribute to the connection information stored in the relational database (e.g., wiki, crowdsourcing, and so forth). It will be understood that the present technology may be configured to interrelate data between varieties of object types (music may relate to movies, books, architecture, etc.), not just a single object type (music relates only to other types of music that you might like).

Figure 1:
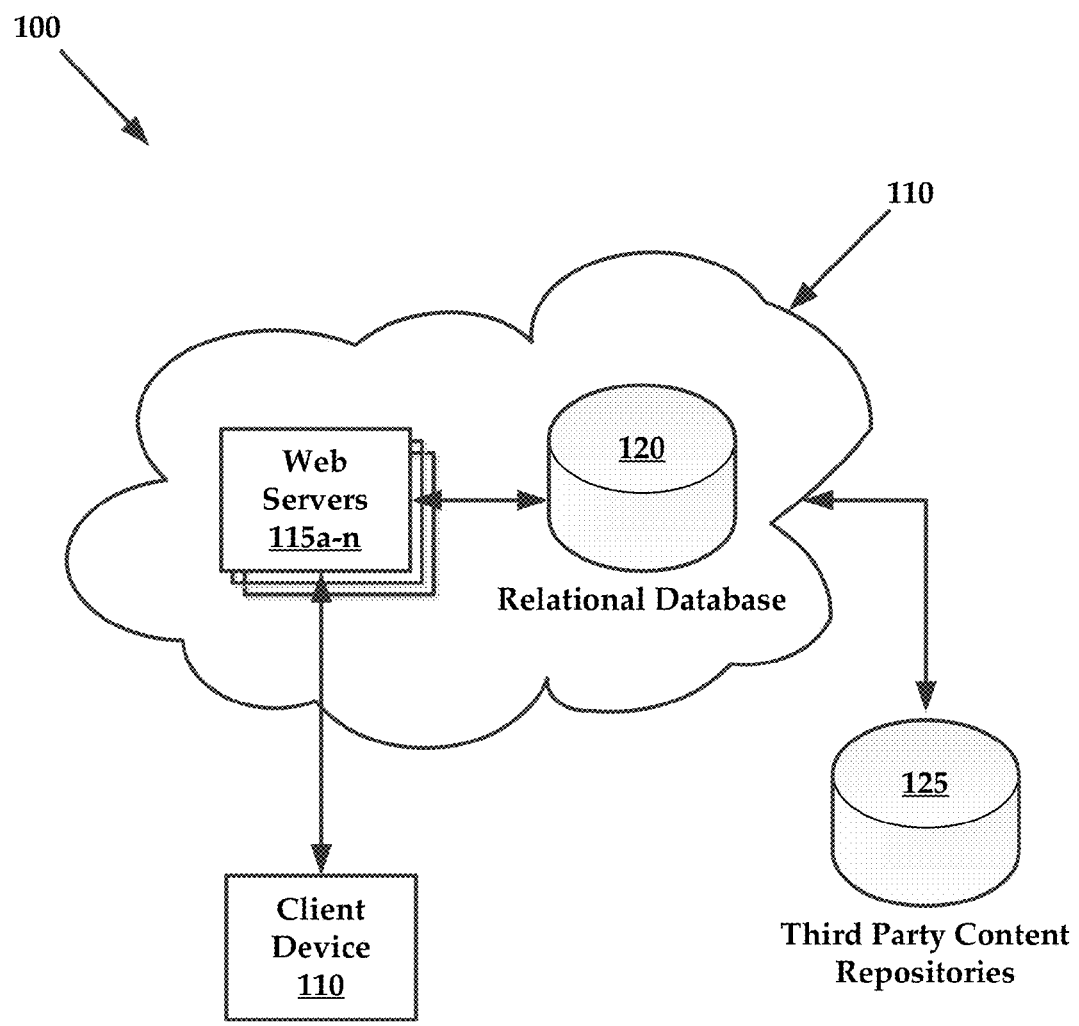
FIG. 1 is an architectural diagram of an exemplary system for practicing the present technology.

FIG. 1 illustrates an exemplary architecture 100 for practicing aspects of the present technology. Architecture 100 is shown as generally having a client device 105 that is communicatively couplable with a relational analysis system 110, hereinafter "system 110." It will be understood that a plurality of client devices may communicatively couple with the system 110 via a private or public communications network such as the Internet.

Generally speaking, the system 110 may include one or more web servers 115a-n and one or more relational databases, such as relational database 120. The servers 115a-n may each be generally described with reference to computing system 400, described in greater detail with reference to FIG. 4, although it will be understood that one or more of the servers 115a-n may include a particular purposes computing system configured to establish connections between objects and display those connections in a graphical format.

The system 110 may communicatively couple with a variety of third party content repositories 125. These content repositories 125 provide the system 110 with digital content that corresponds to correlated objects. Digital content may include textual content, images, audio files, and video files—just to name a few. For example, when exploring the relationships between a musician and their influences, image files for both the musician and their influences may be obtained by the system 110 from one or more content repositories.

According to some embodiments, the system 110 may communicatively couple with the third party content repositories 125 via an application programming interface ("API"). The API may utilize either secured or unsecured communications protocols for the transmission of information between the system 110 and the third party content repositories 125.

One of ordinary skill in the art will appreciate that the architecture 100 may include many other devices or systems (e.g., routers, firewalls, load balancers, and so forth) that allow for a plurality of client devices to interact with the system 110 or a plurality of content provider systems. A detailed discussion of these additional devices or systems has been omitted for the purpose of brevity.

In some embodiments, the system 110 may be configured a cloud computing environment. In general, a cloud-based computing environment is a resource that typically combines the computational power of a large grouping of processors (such as within servers 115a-n) and/or that combines the storage capacity of a large grouping of computer memories or storage devices (such as relational database 120). For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers such as web servers 115a-n with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

According to some embodiments, the system 110 may facilitate the use of a website or web-based interface that is accessible by the client device 105. Utilizing the website, end users may query for objects, or view the relationships between two or more objects that have been arranged into a grid or matrix according to a narrative format. In other embodiments, the system 110 may be accessed via an executable application that resides on the client device 105, or within a cloud based computing environment.

While visual arrangements of objects such as grids or matrices have been proposed, other types of arrangements that would be known to one of ordinary skill in the art such as concentric radial graphs, lists, Venn diagrams, and so forth, may likewise be utilized in accordance with the present technology.

Figure 2:
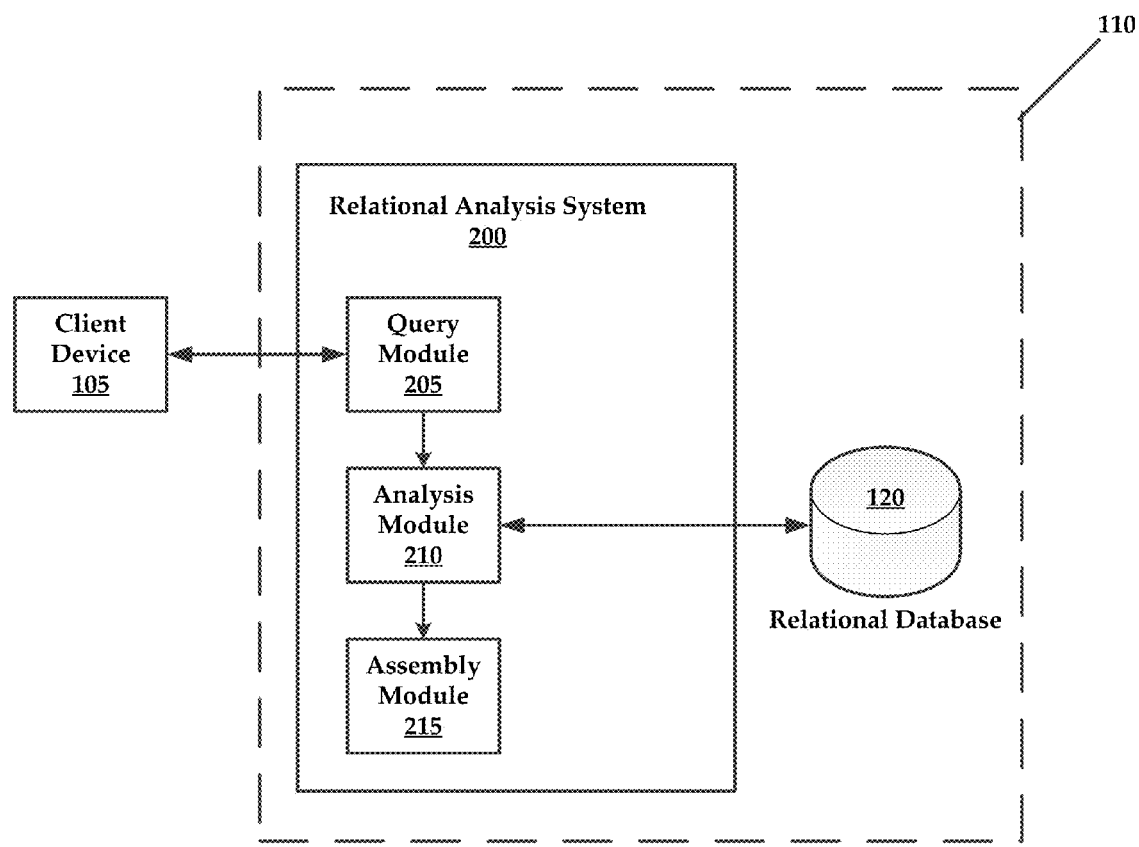
FIG. 2 is an exemplary relational analysis system, constructed in accordance with the present technology.

FIG. 2 illustrates an exemplary relational analysis system 200 that may reside with the system 110. The relational analysis system 200 may be generally described as being configured to correlate and display objects via relational analyses.

According to some embodiments, the relational analysis system 200 may generally be described as including a query module 205, an analysis module 210, and an assembly module 215. It is noteworthy that the system 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the system 200 may include separately configured web servers.

The query module 205 may receive queries for correlating and displaying relationships or connections between two or more objects. In some applications, the query module 205 may receive queries from a web interface that couples the client device 105 to the relational analysis system 200. Upon receipt of a query, the query module 205 may parse the query to determine objects included in the query. For example, the query module 205 may determine names, dates, locations, and the like, from a received query. The query module 205 may also utilize machine learning algorithms to improve efficiency and accuracy of system. For example, the query module 205 may utilize machine learning to determine that a query including the words "New" and "York" should be combined into "New York" rather than being understood by the system to be separate and unrelated words.

Each received query may be managed as a separate event and logged for further analysis. Moreover, web analytics may be gathered from the client device 105 each time a query is received therefrom.

The query module 205 may communicatively couple with the analysis module 210. That is, the query module 205 may communicate information that corresponds to objects that have been determined from a received query. For example, the query module 205 may communicate the string "David Bowie" to the analysis module 210, based upon receiving a query that includes the term "David Bowie."

The analysis module 210 may then search the relational database 120 using the information for the object. The analysis module 210 may determine one or more additional objects within the relational database 120 that are relevant or correlated to a first object. Objects may be either directly connected (e.g., only one connection away) or indirectly connected (e.g., greater than one connection away) together. Exemplary direct connections may include a musician and their discography.

It will be understood that a correlation or relationship between two or more objects may be determined from knowledge or information gathered regarding objects. Therefore, the greater the amount of information known about an object, the greater likelihood that a correlation (or multiple correlations) to another object may be determined. The types of knowledge or information regarding an object may include any type of descriptive information about the object. Information may be input into the system by scraping web content (e.g., web pages, crawling or searching third party databases, direct input from system administrators, or may even include information gathered via crowdsourcing where end users may contribute information or knowledge about objects).

To establish connections between objects in response to a query, the analysis module 210 may crawl the relational database 120 to create a graph of objects and connections out to a defined radius around a first object. Advantageously, the analysis module 210 may gather these additional objects and sort them based on the rank of each object. For example, if the first object is connected to an additional object via numerous connections, the additional object may be ranked higher than other objects having fewer connections therebetween.

This collection of objects is then presented to the user in a visually apprehensible format, such as a graphical user interface that includes one or more graphs created from depictions of the objects.

According to some embodiments, the present technology may be directed to the generation of long-tail responses to queries. That is, rather than returning a single response to a query that includes a single object or multiple objects that are themselves unrelated to one another, the present technology may be configured to generate long-tail responses for queries. Thus, when generating a query response, the present technology begins with a header object, which is the object included in/determined from the query. To complete the response, additional objects are "attached" to the header object such that each successive object that is added to the response is related to the object which precedes it. Therefore, the response creates a "tail" of related objects that extend from the header object. The linkages that join the objects of the tail together are the known relationship values, which have been described in greater detail above.

According to some embodiments, the analysis module 210 may be configured to perform a method for correlating objects together in a database according to relational data. The analysis module 210 may be configured to, for each object in a database, determine a static weight, the static weight representing a number of relational connections between each object and one or more connected entities. Additionally, the analysis module 210 may be adapted to set a delta weight for each object, the delta weight being equal to the static weight.

In some instances, the analysis module 210 may determine which object in the database comprises a highest delta weight, and also propagate the highest delta weight of the object to each of the connected entities. In accordance with the present disclosure, the analysis module may add the highest delta weight to a static weight and a delta weight for each of the connected entities and set the delta weight for the object to zero.

It is noteworthy to mention that the method executed by the analysis module 210 may terminate upon determining that a highest delta weight for at least one object is below a threshold value.

According to some embodiments, the analysis module 210 may determine a relevancy for a direct or indirect connected entity based upon any of a static weight, distance, connection type, or any combinations thereof.

With regard to weighting, each object may be provided with at least one of a static weight and a dynamic weight. The analysis module 210 may associate a static weight with an object that includes a defined weight for each different connection type (e.g., connected entities associated with the object). According to some embodiments, each object starts with an initial static weight $W_i$, and delta weight $dW_i$. In some instances, the static weight and the delta weight are substantially equal in magnitude to one another. Initially, the $W_i$ and $dW_i$ of an object may be a non-zero value. The $dW_i$ value may be based on an amount and/or connection weight for each of the connected entities and other similar data.

In operation, the analysis module 210 may be configured to find a first object i that has largest $dW_i$. The analysis module 210 may, for a first object, "shoot" or propagate a $dW_i$ to each connected entity j (e.g., additional objects that are directly connected to the object i). The analysis module 210 determines connected entities j by searching the relational database 120 for directly connected objects. Thus, the present technology may iteratively locate an object in the database with the highest delta weight value and propagate the delta weight to each of the object's directly connected entities. Thus, after propagating the delta weight for an object having the highest delta weight in the database, the present technology may repeat the process by subsequently locating an additional object in the database with the highest delta weight. After $dW_i$ is applied to each connected object j, the analysis module 210 may set the $dW_i$ to zero. Again, it is noteworthy to mention that this process may be repeated for every object i in the graph (or database if the graph or matrix has not been created).

In some embodiments, the $dW_i$ for an object may be scaled by a connection rank for a connection between the object i and object j. This value may be referred to as the $dW_{ij}$. The $dW_{ij}$ may be added to both the $dW_j$ and the $W_j$ of a connected entity j such that the sum of $W_j$ and $dW_{ij}$ equal the $W_j$. Moreover, the sum of the $dW_j$ and the $dW_{ij}$ may equal $dW_j$.

According to some embodiments, the analysis module 210 may be configured to propagate the rank of each object i through the entire graph. For example, the analysis module 210 may iteratively propagate the rank of each object i to its direct or adjacent neighbors. It will be understood that the analysis module 210 may propagate the ranks of objects periodically or continually to allow for full propagation throughout the relational database 120.

In some application, the analysis module 210 may reduce the need for this iterative process by applying heuristics to determine which objects will have the greatest impact on the graph (or within the relational database). When the analysis module 210 determines objects that have the greatest impact (e.g., greatest number of connections) on the graph, the analysis module 210 may utilize these objects as initial "shooters."

The analysis module 210 may utilize many different methods (e.g., algorithms, statistics, heuristics, logic, etc.) to compare or relate the object to other objects within the relational database 120. For example, in some embodiments, the analysis module 210 may utilize one or more algorithms such as progressive refinement. Generally speaking, progressive refinement may be utilized to calculate radiosity in offline rendering processes. Progressive refinement allows for an early approximation and visualization of a system's radiosity before the full solution or analysis of the entire dataset is complete. The analysis module 210 utilizes progressive refinement such that the highest ranked objects "shoot" or contribute their weighting first/early on in the correlation process.

While the analysis module 210 has been described as being configured to utilize a progressive refinement algorithm, other algorithms, statistics, heuristics, logic, or combinations thereof that would be known one of ordinary skill in the art with the present disclosure before them are likewise contemplated for use in accordance with the present technology.

The analysis module 210 may periodically or automatically and continuously process the relational database to accommodate new objects added to a graph or the relational database 120. The creation of graphical representations of connections between objects will be discussed in greater detail infra.

Advantageously, the analysis module 210 may, in some embodiments, utilize various types of dynamic object ranking processes. For example, the analysis module 210 may use additional weighting or signals to temporally scale the static rank of each (or subsets) of objects within the database 120. These signals may include location-based data, user habits, content ratings, trends, promotion windows, and/or other web analytics that would be known to one of ordinary skill in the art with the present disclosure before them. A promotional window may comprise a timeframe for a specific event, advertising campaign, or other time-defined event.

In operation, when a query is received by the query module 205, the query module 205 parses the query to determine one or more objects included therein. Returning to the above described example, the query may include a header object of "David Bowie."

Responsive to receiving the query, the analysis module 210 locates additional objects (e.g., connected entities) that are relatable to the header object the analysis module 210 may then determine the relationship or connections between the objects. For example, if the object is "David Bowie" the analysis module 210 may locate albums released by David Bowie, movies that utilized individual songs created by David Bowie, notable artists that were influenced by David Bowie, and so forth. The analysis module 210 may determine objects that are correlated to David Bowie based upon propagation of rankings with the relational database 120 as described supra.

Referring now to FIGS. 2 and 3A-C collectively, each of which illustrates an exemplary graphical user interface constructed in accordance with the present technology. With respect to FIG. 3A, in some embodiments the assembly module 215 may cooperate with the analysis module 210 to generate a GUI 300 that includes relational data for the object of the query. Broadly speaking, the GUI 300 includes an "explore" graph 305. The assembly module 215 may create the graphical interface and arrange objects according to rankings established by the analysis module 210. In some embodiments, the assembly module 215 may utilize a GUI template and populate the template with items such as image files that correspond to the object associated with a particular node of the graph 305.

The graph 305 shows the first object 310, represented by an image file of David Bowie. Additional objects such as objects 315 associated with David Bowie may be arranged according to node and edge graphical relationships. In some embodiments, these node and edge relationships may be visually arranged as a grid or matrix. For example, each column of the graph 305 may represent an individual edge (e.g., connection type). As such, each object disposed vertically within the column represents an associated node. For example, if an edge of discography may include a plurality of associated nodes that represent individual albums within the discography.

In sum, the present technology may generate a graphical representation of relationships between the header object and a plurality of connected entities using a plurality of edges and associated nodes. It is noteworthy that each of the plurality of edges corresponds to a relationship type and further that each of the plurality of edges comprises associated nodes. The associated nodes may comprise connected entities that are connected to the header object by at least one relationship type.

It is noteworthy to mention that these node/edge relationships have been determined via crawling, sorting, and/or ranking of the relational database 120 via the analysis module 210.

Objects towards the left hand side of the graph 305 may be understood as being strongly correlated (e.g., having relatively numerous) to the first object 310, with correlation strength decreasing the further away the object is disposed relative to the first object 310. In some applications, each object within the graph 305 may include object type information such as book, album, band, and so forth, along with an object name. It is noteworthy to mention that clicking on any of the objects 315 within the graph 305 may initiate the creation of a new graph (not shown) with the selected object replacing the first object 310.

Figure 3A:
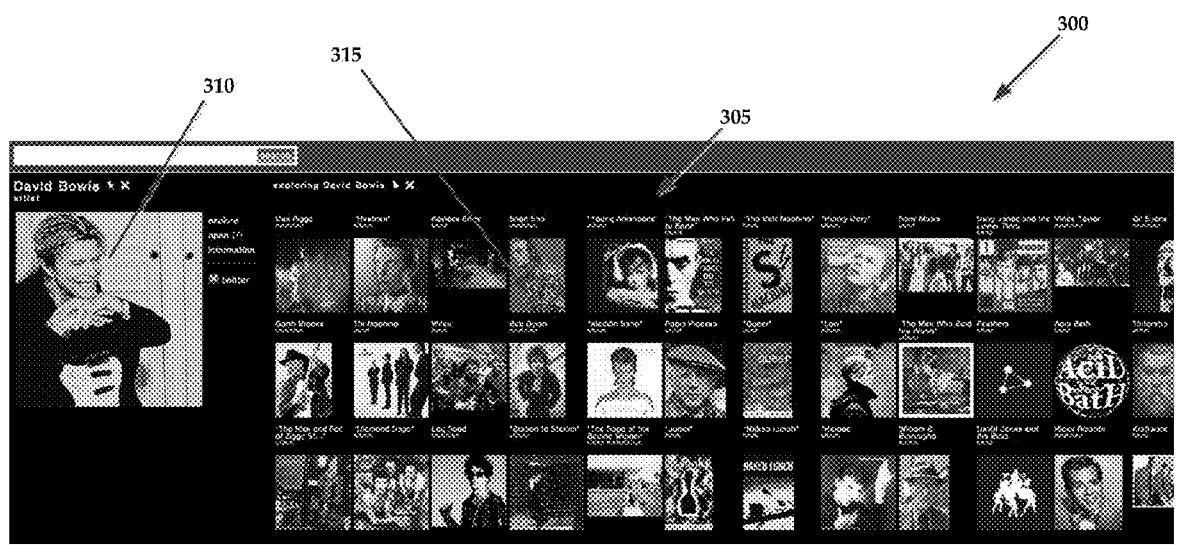
FIG. 3A is an exemplary graphical user interface illustrating an explore connections graph.
Figure 3B:
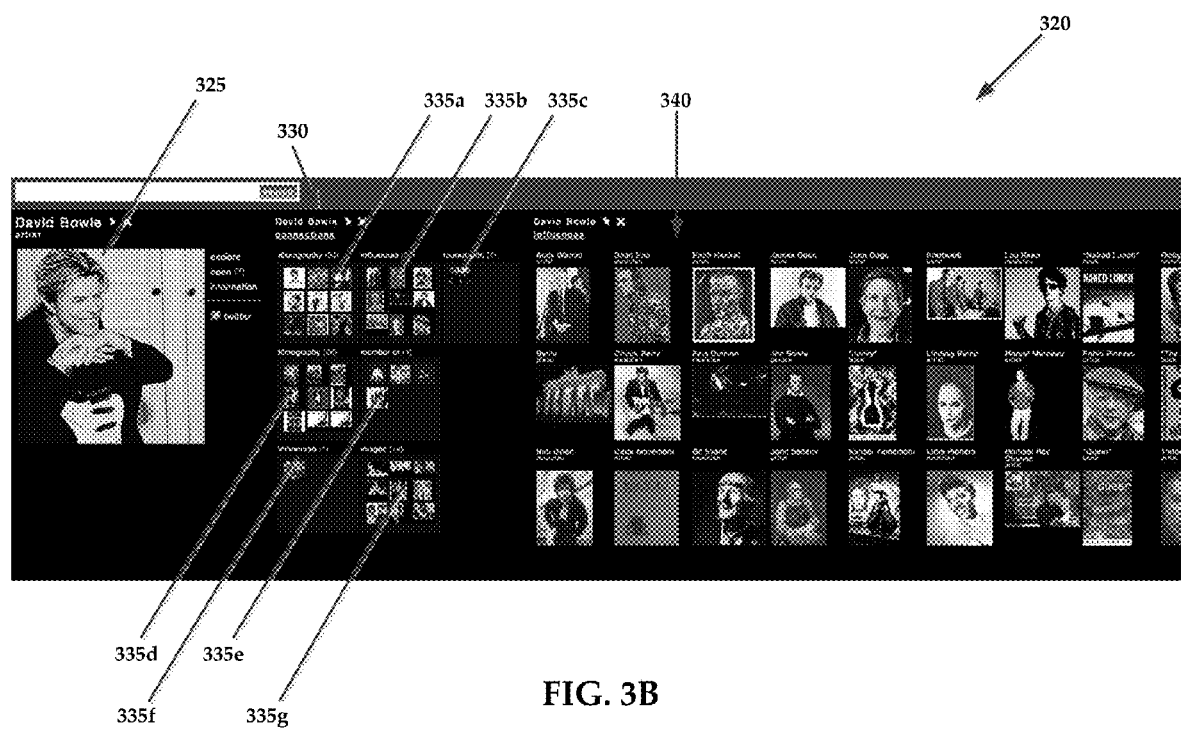
FIG. 3B is an exemplary graphical user interface illustrating a connections matrix.

With respect to FIG. 3B, another exemplary GUI 320 is shown that includes a first object 325 having a connections matrix 330 that comprises a group of individual graphs 335a-g. It is noteworthy to mention that each of the individual graphs 335a-g correspond to a connection type such as has a discography 335a, has influences 335b, toured with 335c, has a filmography 335d, was a member of 335e, was influenced by 335f, has images of 335g, and so forth.

The GUI 320 may also include a larger influences graph 340 that includes the objects of graph 335b along with additional objects that have been determined by the system to be influences of David Bowie.

According to some embodiments, the analysis module 210 may relate objects together in a narrative format. For example, the analysis module 210 may treat objects as a noun and relate that noun to other nouns (e.g., objects) via verbs. Utilizing the above described example, the noun of "David Bowie" may be understood to have (verb) a discography (noun) that includes (verb) a plurality of albums (nouns). These albums may be arranged within a graph according to any type of weighting data. For example, albums may be arranged from highest grossing sales to lowest grossing sales, moving from left to right, respectively, across the graph.

Figure 3C:
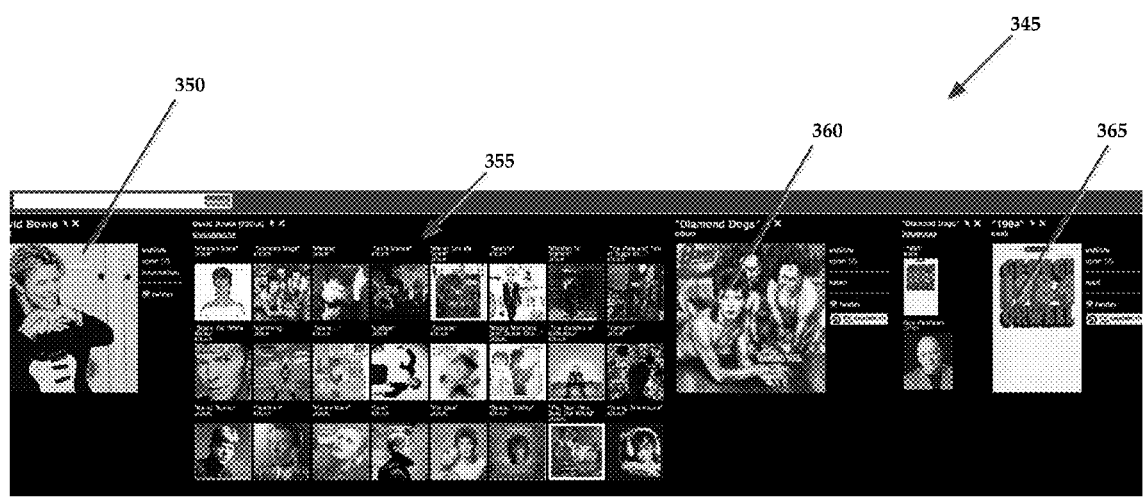
FIG. 3C is an exemplary graphical user interface illustrating a graphical representation of the relationship between two objects.

With respect to FIG. 3C, a GUI 345 illustrating a relationship between two separate objects is shown. The GUI 345 is again, shown as having a first object 350 of David Bowie. A discography graph 355 includes a plurality of albums. Assuming that the album of "Diamond Dogs" has been selected from the plurality of albums, the system may display a seeming unrelated object that includes a book by George Orwell, entitled 1984. These objects were connected together because the "Diamond Dogs" album was slated to be utilized as the soundtrack to a film version of the book 1984. Because the system previously established a connection (either direct or indirect) between Diamond Dogs and the book 1984, the system may display this connection when either of these objects is selected for further examination.

Figure 3D:
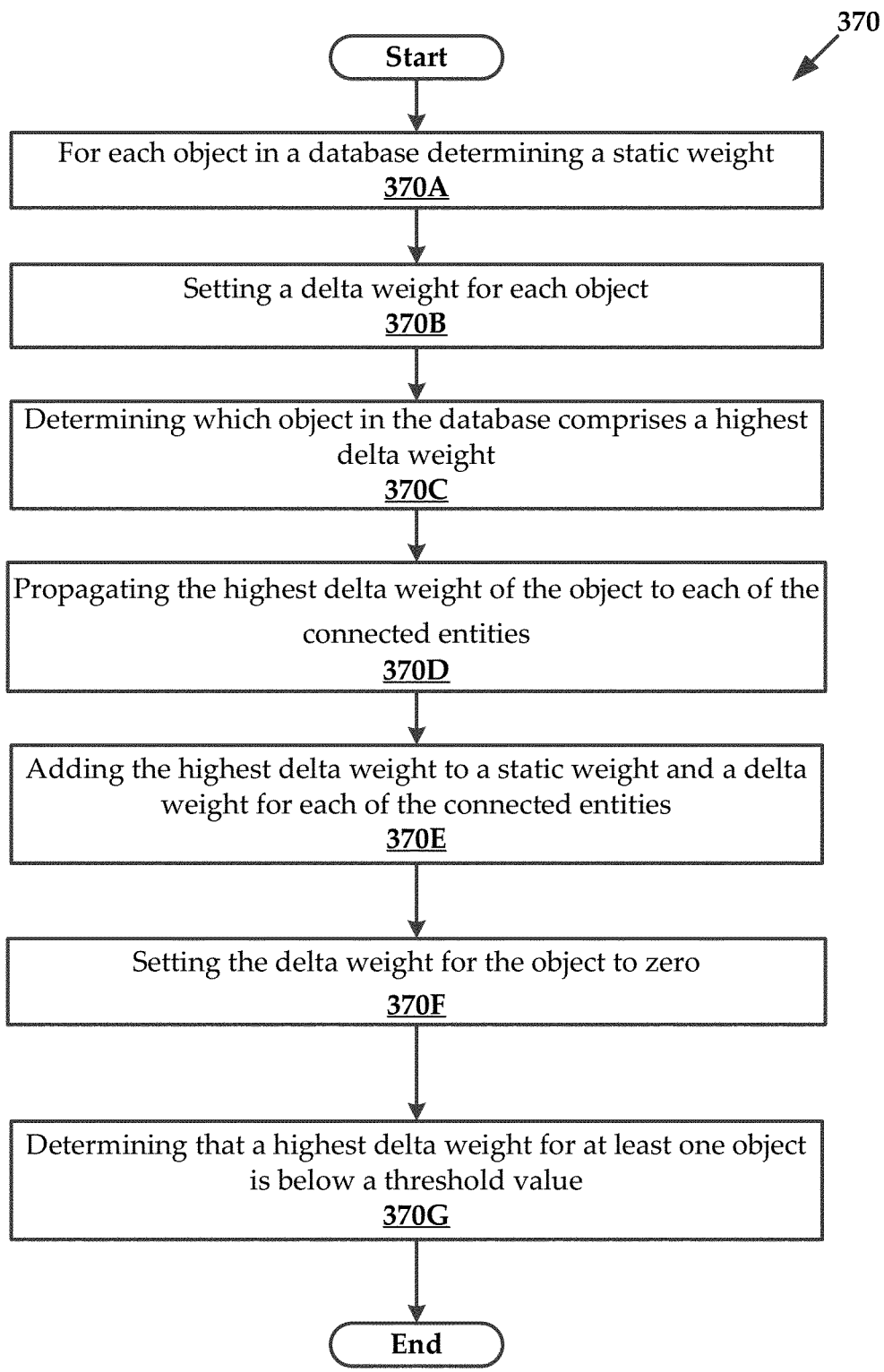
FIG. 3D is a flowchart of an exemplary method for correlating objects together in a database according to relational data.

FIG. 3D is a flowchart of an exemplary method for correlating objects together in a database according to relational data. The method may comprise a step 370A of for each object in a database determining a static weight, the static weight representing a number of relational connections between each object and one or more connected entities. Next, the method may comprise a step 370B of setting a delta weight for each object, the delta weight being equal to the static weight.

Additionally, the method may comprise a step 370C of determining which object in the database comprises a highest delta weight, a step 370D of propagating the highest delta weight of the object to each of the connected entities, and a step 370E of adding the highest delta weight to a static weight and a delta weight for each of the connected entities.

According to some embodiments, the method may comprise a step 370F of setting the delta weight for the object to zero. It will be understood that the method terminates upon a step 370G of determining that a highest delta weight for at least one object is below a threshold value.

Figure 3E:
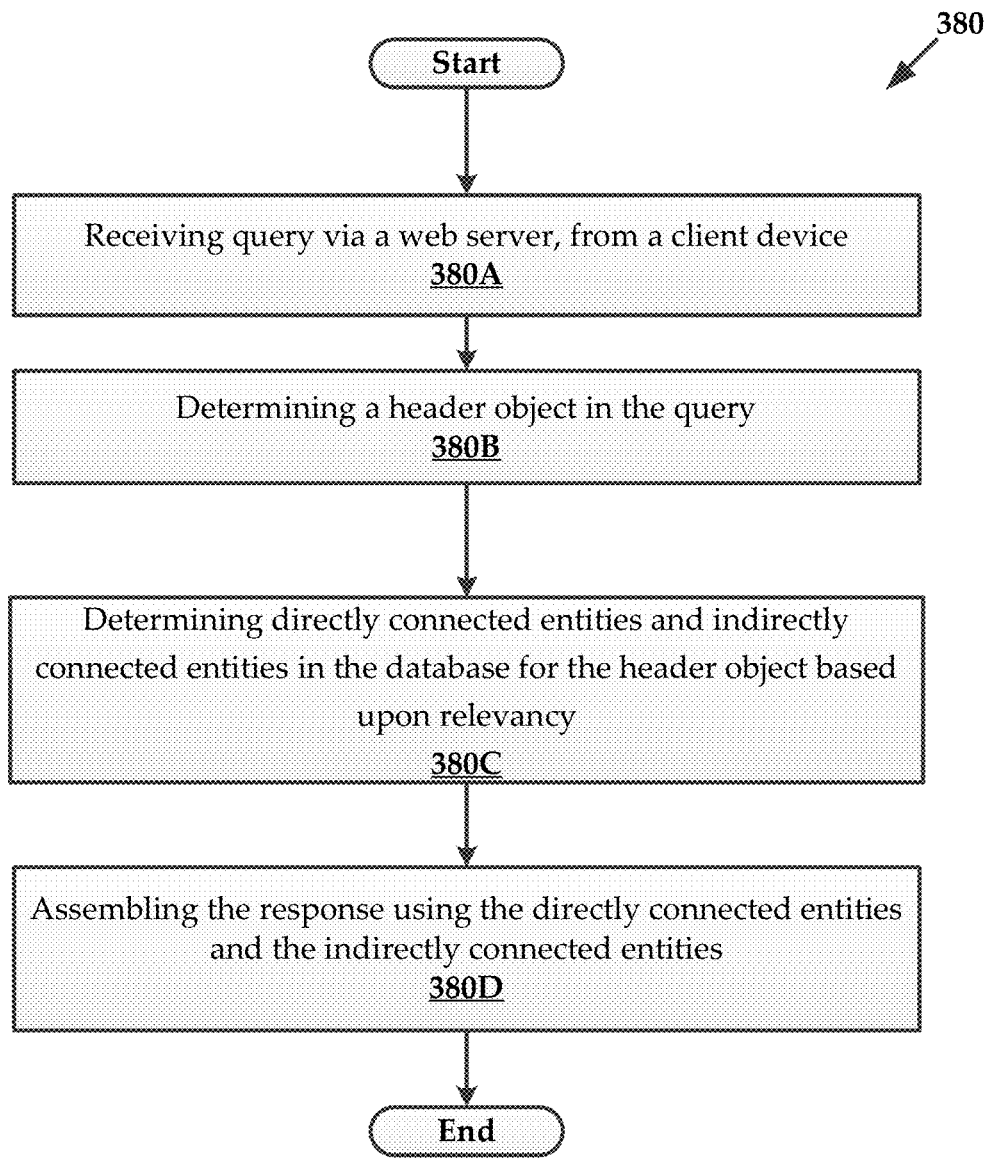
FIG. 3E is a flowchart of an exemplary method for processing a query.

FIG. 3E is a flowchart of an exemplary method for processing a query. The method 380 may comprise a step 380A of receiving query via a web server, from a client device. Additionally, the method may comprise a step 380B of determining a header object in the query, a step 380C of determining directly connected entities and indirectly connected entities in the database for the header object based upon relevancy, as well as a step 380D of assembling the response using the directly connected entities and the indirectly connected entities.

Figure 4:
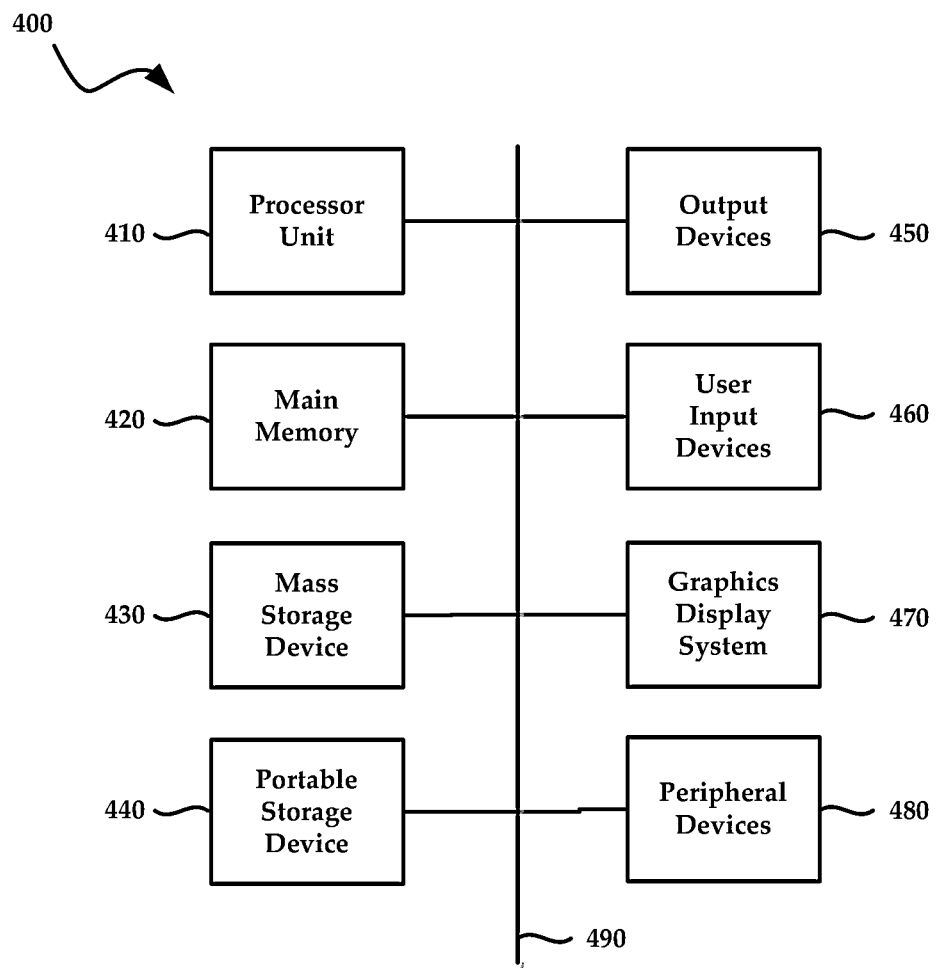
FIG. 4 is an architectural diagram of an exemplary computing system for practicing the present technology.

FIG. 4 illustrates an exemplary computing system 400 that may be used to implement an embodiment of the present technology. The computing system 400 of FIG. 4 includes one or more processors 410 and main memory 420. Main memory 420 stores, in part, instructions and data for execution by processor 410. Main memory 420 can store the executable code when the system 400 is in operation. The system 400 of FIG. 4 may further include a mass storage device 430, portable storage devices 440, output devices 450, user input devices 460, a graphics display 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device(s) 440, and graphics display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage media, such as a floppy disk, compact disk or digital video disc, to input and output data and code to and from the computer system 400 of FIG. 4. The system software for implementing embodiments of the present technology may be stored on such a portable media and input to the computer system 400 via the portable storage device 440.

User input devices 460 provide a portion of a user interface. User input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Graphics display system 470 may include a liquid crystal display (LCD) or other suitable display device. Graphics display system 470 receives textual and graphical information, and processes the information for output to the display device.

Peripheral devices 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present technology and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage media" and "computer-readable storage media" as used herein refer to any media or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description.

What is claimed is:

1. A method for correlating objects together in a database according to relational data, the method comprising:
   for each object in a database:
      determining a static weight, the static weight representing a number of relational connections between each object and one or more connected entities; and
      setting a delta weight for each object, the delta weight being equal to the static weight;
   determining which object in the database comprises a highest delta weight;
   propagating the highest delta weight of the object to each of the connected entities;
   adding the highest delta weight to a static weight and a delta weight for each of the connected entities;
   setting the delta weight for the object to zero; and
   wherein the method terminates upon determining that a highest delta weight for at least one object is below a threshold value.

2. The method according to claim 1, further comprising establishing a connection weight between the object and at least one of its connected entities.

3. The method according to claim 2, further comprising scaling the delta weight of an object by multiplying the delta weight by a scaling factor, wherein the scaling factor modifies an amount of the delta weight that is propagated from the object to one or more connected entities.

4. The method according to claim 1, further comprising:
   receiving query via a web server, from a client device; and
   generating, via the web server, a response for the query by:
      determining a header object in the query;
      determining directly connected entities and indirectly connected entities in the database for the header object based upon relevancy; and
      assembling the response using the directly connected entities and the indirectly connected entities.

5. The method according to claim 4, wherein relevancy comprises any of a static weight, distance, connection type, or any combinations thereof.

6. The method according to claim 4, further comprising scaling the static weight to affect the relevancy of an indirectly connected entity based upon a connection distance between the header object and the indirectly connected entity.

7. The method according to claim 4, further comprising determining a rank for each object, the rank comprising the static weight combined with a dynamic weight, the dynamic weight comprising any of: location-based data, user habits, content ratings, trends, promotion windows, web analytics, or any combinations thereof.

8. The method according to claim 4, further comprising generating, via the web server, a graphical representation from a plurality of edges, each of the plurality of edges corresponding to a relational connection type, the nodes comprising directly or indirectly connected entities having at least one relational connection type.

9. A method for processing a query, the method comprising:
   receiving query via a web server, from a client device; and
   generating, via the web server, a response for the query by:
      determining a header object in the query;
      determining directly connected entities and indirectly connected entities in the database for the header object based upon relevancy; and
      assembling the response using the directly connected entities and the indirectly connected entities.

10. The method according to claim 9, further comprising arranging the plurality of edges and nodes into a matrix, wherein each of the plurality of edges comprises a column of the matrix and the nodes for the column are arranged according a final weight, wherein the final weight comprises a static weight and a dynamic weight.

11. The method according to claim 10, wherein the dynamic weight comprises any of: location-based data, user habits, content ratings, trends, promotion windows, web analytics, or any combinations thereof.

12. The method according to claim 9, further comprising arranging the plurality of edges and nodes according to a narrative format, wherein the narrative format comprises the header object as a first noun, at least one of the nodes as a second noun, further wherein the first noun and the second noun are associated with one another by a verb phrase which defines a relationship type.

13. The method according to claim 9, wherein the verb phrase is selected from any of: has a discography, has influences, toured with, has a filmography, was a member of, has influenced, topic of, referenced by, starred in, worked with, produced by, directed by, and has images of.

14. A system for correlating objects together in a database according to relational data, the system comprising:
   at least one server that is selectively coupleable to a client device, the at least one server comprising a processor configured to execute instructions that comprise:
      an analysis module that, for each object in a database:
         determines a static weight, the static weight representing a number of relational connections between each object and one or more connected entities; and
         sets a delta weight for each object, the delta weight being equal to the static weight;
      determines which object in the database comprises a highest delta weight;
      propagates the highest delta weight of the object to each of the connected entities;
      adds the highest delta weight to a static weight and a delta weight for each of the connected entities;
      sets the delta weight for the object to zero; and
      wherein upon the analysis module determining that a highest delta weight for at least one object is below a threshold value, the analysis module terminates.

15. The system according to claim 14, wherein the analysis module establishes a connection weight between the object and at least one of its connected entities.

16. The system according to claim 15, wherein the analysis module scales the delta weight of an object by multiplying the delta weight by a scaling factor, wherein the scaling factor modifies an amount of the delta weight that is propagated from the object to one or more connected entities.

17. The system according to claim 14, further comprising a query module that:
  receives query via a web server, from a client device; and
  generates, via the web server, a response for the query by:
    determining a header object in the query;
    determining directly connected entities and indirectly connected entities in the database for the header object based upon relevancy; and
  an assembly module that assembles the response using the directly connected entities and the indirectly connected entities.

18. The system according to claim 17, wherein relevancy comprises any of a static weight, distance, connection type, or any combinations thereof.

19. The system according to claim 17, wherein the analysis module scales the static weight to affect the relevancy of an indirectly connected entity based upon a connection distance between the header object and the indirectly connected entity.

20. The system according to claim 17, wherein the analysis module determines a rank for each object, the rank comprising the static weight combined with a dynamic weight, the dynamic weight comprising any of: location-based data, user habits, content ratings, trends, promotion windows, web analytics, or any combinations thereof.

* * * * *